(12) United States Patent
Toko

(10) Patent No.: US 10,830,407 B2
(45) Date of Patent: Nov. 10, 2020

(54) VEHICULAR LAMP

(71) Applicant: STANLEY ELECTRIC CO., LTD., Tokyo (JP)

(72) Inventor: Yasuo Toko, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/520,393

(22) Filed: Jul. 24, 2019

(65) Prior Publication Data

US 2020/0032978 A1 Jan. 30, 2020

(30) Foreign Application Priority Data

Jul. 24, 2018 (JP) ................... 2018-138259

(51) Int. Cl.
*F21S 41/64* (2018.01)
*F21S 41/00* (2018.01)
*G02F 1/13* (2006.01)

(52) U.S. Cl.
CPC ............. *F21S 41/645* (2018.01); *F21S 41/00* (2018.01); *G02F 1/1313* (2013.01)

(58) Field of Classification Search
CPC ........ F21S 41/00; F21S 41/645; G02F 1/1313
See application file for complete search history.

(56) References Cited

U.S. PATENT DOCUMENTS

| 8,988,625 B2 | 3/2015 | Yamazaki et al. |
| 2004/0100676 A1 | 5/2004 | Fanton et al. |
| 2005/0168794 A1 | 8/2005 | Fanton et al. |
| 2007/0058123 A1 | 3/2007 | Um et al. |
| 2013/0120701 A1 | 5/2013 | Yamazaki et al. |

(Continued)

FOREIGN PATENT DOCUMENTS

| DE | 102015109837 A1 | 12/2016 |
| JP | 2005183327 A | 7/2005 |

(Continued)

OTHER PUBLICATIONS

Extended European Search Report (EESR) dated Dec. 5, 2019, issued in European Application No. 19186056.6.

(Continued)

*Primary Examiner* — Thanh Nhan P Nguyen
(74) *Attorney, Agent, or Firm* — Holtz, Holtz & Volek PC

(57) ABSTRACT

A vehicular lamp includes: a light source; a liquid crystal element including a liquid crystal layer and a pair of sandwiching substrates; and a projection optical system. In this vehicular lamp, one of the pair of sandwiching substrates in the liquid crystal element includes a first transparent substrate, and a common electrode disposed on the first transparent substrate, and the other of the pair of sandwiching substrates in the liquid crystal element includes a second transparent substrate, a plurality of wiring electrodes disposed on the second transparent substrate, an insulating layer disposed on the second transparent electrode to cover the plurality of wiring electrodes, a plurality of segment electrodes disposed on the insulating layer, and a plurality of connection electrodes configured to electrically connect each of the plurality of wiring electrodes to each of the plurality of segment electrodes through the insulating layer.

11 Claims, 11 Drawing Sheets

(56) References Cited

U.S. PATENT DOCUMENTS

| | | | |
|---|---|---|---|
| 2013/0335459 A1* | 12/2013 | Tokoo | G02F 1/133526 |
| | | | 345/690 |
| 2015/0252974 A1 | 9/2015 | Hu | |
| 2016/0077402 A1 | 3/2016 | Takehara et al. | |
| 2019/0206350 A1* | 7/2019 | Toko | G02F 1/133753 |

FOREIGN PATENT DOCUMENTS

| | | |
|---|---|---|
| JP | 6212218 B2 | 9/2017 |
| WO | 2015018729 A1 | 2/2015 |

OTHER PUBLICATIONS

Related U.S. Appl. No. 16/232,278, Title: "Liquid Crystal Element and Lighting Apparatus," First Named Inventor: Yasuo Toko, Filed: Dec. 26, 2018.

\* cited by examiner

FIG. 6
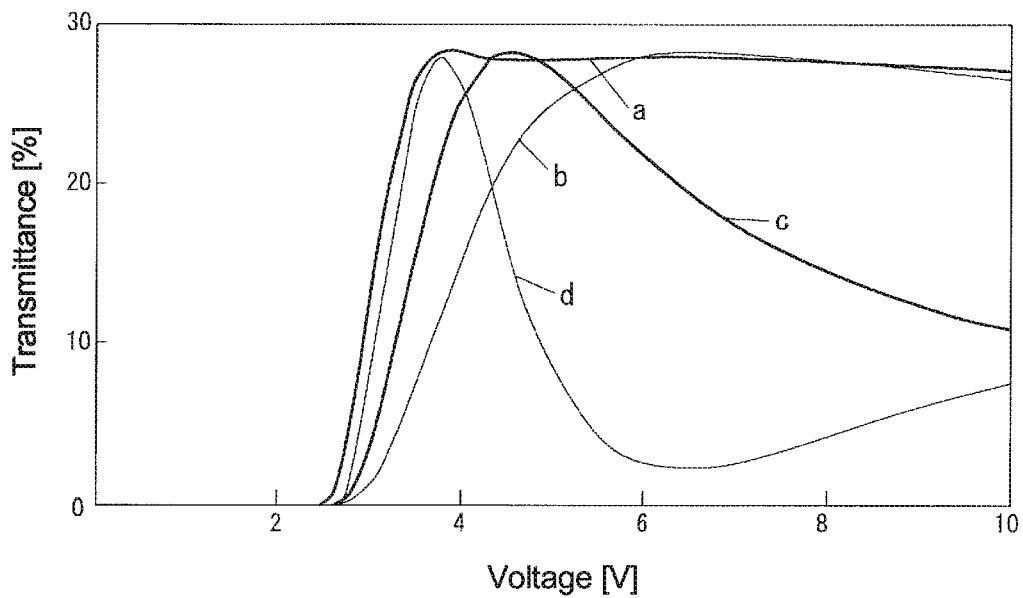
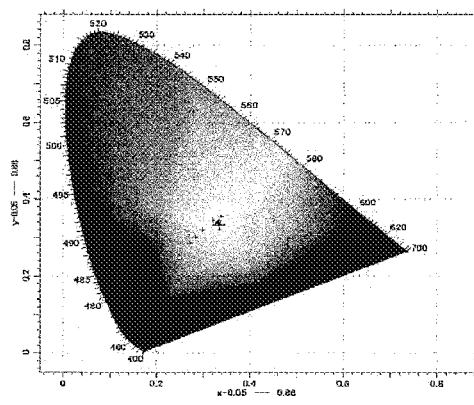
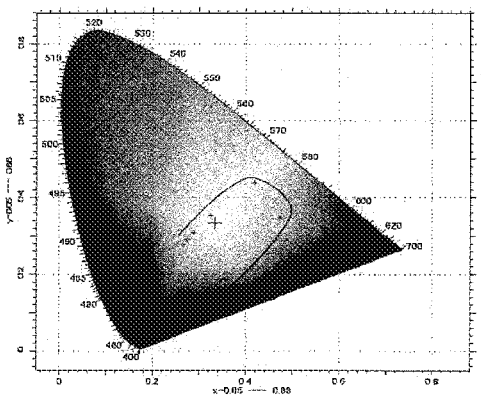
FIG. 7A  FIG. 7B

VEHICULAR LAMP

This application claims the priority benefit under 35 U.S.C. § 119 of Japanese Patent Application No. 2018-138259 filed on Jul. 24, 2018, which is hereby incorporated in its entirety by reference.

TECHNICAL FIELD

The present invention relates to a vehicular lamp including a liquid crystal element.

BACKGROUND ART

In recent years, in a headlamp for a vehicle, attention has been paid to a technique (referred to as ADB, adaptive driving beam, or the like) for controlling a light distribution form in real time in accordance with a situation in front, that is, presence or absence of an oncoming vehicle, a front running vehicle, or the like, and a position thereof. In addition, headlamp systems (called AFS, adaptive front-lighting system, etc.) that adjust the light distribution in the traveling direction in accordance with the steering angle of the steering wheel are becoming popular. A liquid crystal element can be used as a light distribution control element for ADB or AFS (for example, Japanese Patent No. 6212218 or WO2015/018729 corresponding thereto).

Japanese Patent Application Laid-Open No. 2005-183327 discloses a vehicular headlamp which includes a light-emitting portion 11 composed of at least one LED 11a, a light-shielding portion 12 which blocks a part of light irradiated forward from the light-emitting portion to form a cut-off suitable for a light distribution pattern for a vehicular headlamp. Here, the light-shielding portion 12 is composed of an electrooptic element having a light control function, and a controller 14 which controls the light control of the electrooptic element. The vehicular headlamp is configured to selectively control the light control portion by the controller that performs electro-switching control on the electrooptic element to change the shape of the light distribution pattern. As the electrooptic element, for example, a liquid crystal element is adopted.

In the vehicular lamp as described above, an electrooptic element such as a liquid crystal element is configured to have a plurality of pixel electrodes in order to realize selective light control. The pixel electrodes are separated from each other so that a voltage can be applied individually, and a gap for achieving electrical insulation is provided between the adjacent pixel electrodes. In this case, the gap between the adjacent pixel electrodes is, for example, about 10 μm depending on the formation accuracy. Further, in the case where three or more rows of pixel electrodes are provided, since it is necessary to pass a wiring portion for applying a voltage to each of the pixel electrodes in the intermediate row between the pixel electrodes, the gap between the pixel electrodes becomes larger. The gap between the pixel electrodes is a portion that does not contribute to image formation, and causes dark lines to be generated in the light distribution pattern. In the vehicular lamp, since an image formed by the electrooptic element (an image corresponding to the light distribution pattern) is enlarged by a lens or the like and projected to the front of the vehicle body, the dark line as described above is also enlarged and easily visually recognized, which is disadvantageous in that the appearance of the light distribution pattern deteriorates. On the other hand, a solution by narrowing the gap between the adjacent pixel electrodes may be considered, but in this case, it is not preferable because it may cause an increase in manufacturing cost and may easily cause a problem such as a short circuit between the pixel electrodes. In addition, a possible solution is to make the width of the wiring portion to be passed between the pixel electrodes thinner, but in this case, the resistance value of the wiring portion rises, resulting in difficulty of application of necessary and sufficient voltage to the pixel electrodes. In addition, the probability of occurrence of disconnection due to thinning is also disadvantageously increased. Incidentally, such inconveniences are not limited to vehicular lamps, and the same applies to lighting devices that control light distribution patterns using liquid crystal elements and the like in general.

SUMMARY

The present invention was devised in view of these and other problems and features in association with the conventional art. According to an aspect of the presently disclosed subject matter, there can be provided a vehicular lamp having a novel structure including a liquid crystal element.

According to another aspect of the presently disclosed subject matter, a vehicular lamp can include a light source configured to emit light that travels in an optical path; a liquid crystal element disposed on the optical path of light emitted from the light source, and including a liquid crystal layer and a pair of sandwiching substrates configured to sandwich the liquid crystal layer; and a projection optical system disposed on the optical path of light having been transmitted through the liquid crystal element. In this vehicular lamp, one of the pair of sandwiching substrates in the liquid crystal element includes a first transparent substrate, and a common electrode disposed on the first transparent substrate, and the other of the pair of sandwiching substrates in the liquid crystal element includes a second transparent substrate, a plurality of wiring electrodes disposed on the second transparent substrate, an insulating layer disposed on the second transparent electrode to cover the plurality of wiring electrodes, a plurality of segment electrodes disposed on the insulating layer, and a plurality of connection electrodes configured to electrically connect each of the plurality of wiring electrodes to each of the plurality of segment electrodes while penetrating through the insulating layer.

In the vehicular lamp according to the foregoing aspect, the plurality of segment electrodes may be arranged in a matrix. In this case, the plurality of segment electrodes may include a first group of segment electrodes arranged in a first direction in plan view, and widths of the respective segment electrodes in the first group in the first direction may become gradually narrower from one end side toward a center and become wider from the center toward the other end. Furthermore, in this case, the plurality of segment electrodes may include a second group of segment electrodes arranged in a second direction orthogonal to the first direction in plan view, and widths of the respective segment electrodes in the second group in the second direction may become gradually narrower from one end side toward a center and may become wider from the center toward the other end.

Furthermore, in the vehicular lamp according to the foregoing aspect, the segment electrodes each may have a shape different from each other in plan view.

Furthermore, in the vehicular lamp according to any one of the foregoing aspects, the plurality of wiring electrodes may be disposed so as to overlap 80% or more of an entire region defined by gaps between the segment electrodes.

BRIEF DESCRIPTION OF DRAWINGS

These and other characteristics, features, and advantages of the presently disclosed subject matter will become clear from the following description with reference to the accompanying drawings, wherein:

FIG. 6 is a graph showing transmittance characteristics of samples of some liquid crystal elements;

FIGS. 7A and 7B are diagrams showing the chromaticity change of respective samples;

DESCRIPTION OF EXEMPLARY EMBODIMENTS

A description will now be made below to vehicular lamps of the present invention with reference to the accompanying drawings in accordance with exemplary embodiments.

Figure 1:
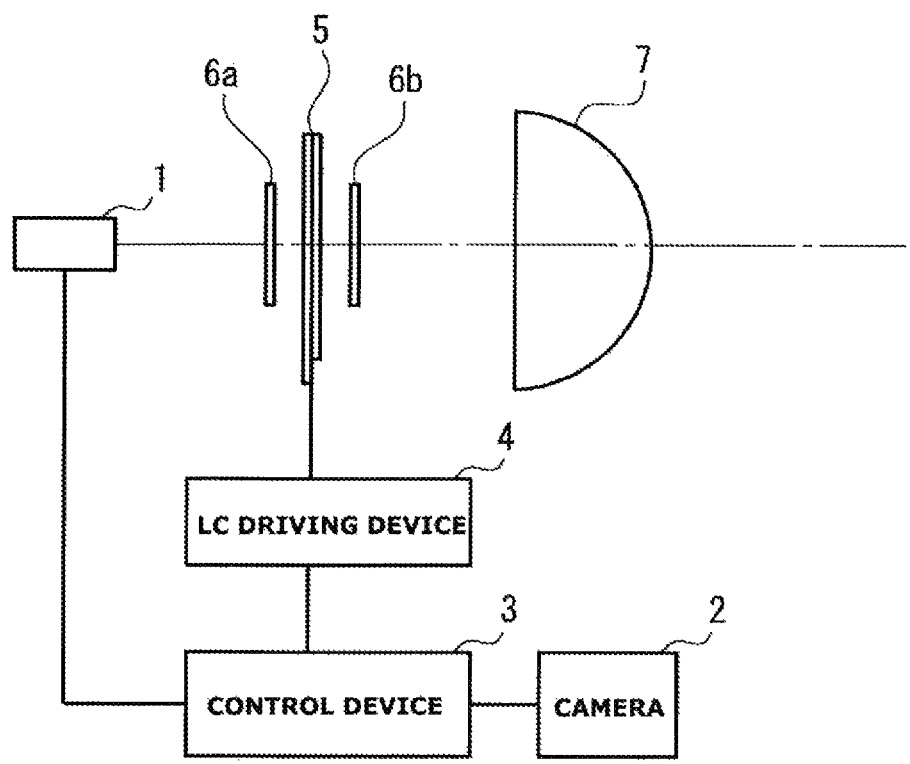
FIG. 1 is a diagram showing a configuration of a vehicular headlamp system according to an exemplary embodiment of the present invention.

FIG. 1 is a diagram showing a configuration of a vehicular headlamp system according to an exemplary embodiment. The vehicular headlamp system illustrated in FIG. 1 is configured to include a light source 1, a camera 2, a control device 3, a liquid crystal driving device 4, a liquid crystal element 5, a pair of polarizing plates 6a and 6b, and a projection lens 7. The vehicular headlamp system is configured to detect the position of a preceding vehicle (including an oncoming vehicle), a pedestrian, or the like existing around the own vehicle on the basis of an image captured by the camera 2, set a certain range including the position of the preceding vehicle, or the like as a non-irradiation range, and set the other range as a light irradiation range to perform selective light irradiation.

The light source 1 is configured to include, for example, a white light LED formed by combining a yellow phosphor with a light-emitting device (LED) that emits blue light. The light source 1 includes, for example, a plurality of white light LEDs arranged in a matrix. As the light source 1, in addition to an LED, a laser, a light source commonly used in a lamp unit for a vehicle such as a light bulb or a discharge lamp may be used. The ON/OFF state of the light source 1 is controlled by the control device 3. Light emitted from the light source 1 enters the liquid crystal element (liquid crystal panel) 5 through the polarizing plate 6a. It should be noted that another optical system such as a lens, a reflecting mirror, or a combination thereof may be provided to an optical path from the light source 1 to the liquid crystal element 5.

The camera 2 can capture the area in front of the own vehicle and outputs an image (information) thereof, and is disposed at a predetermined position in the own vehicle (for example, at the upper part of the inside of the windshield). If the own vehicle is equipped with a camera for other use applications, for example, a camera for use in an automatic braking system, such a camera may also serve as the camera 2 of the present exemplary embodiment.

The control device 3 can detect the position of the preceding vehicle or the like by performing image processing on the basis of an image obtained by the camera 2 capturing images in front of the own vehicle, set a light distribution pattern in which the detected position of the preceding vehicle or the like as the non-irradiation range and the other area as the light irradiation range, generate a control signal for forming an image corresponding to the light distribution pattern, and supply the control signal to the liquid crystal driving device 4. The control device 3 may be realized by executing a predetermined operation program in a computer system having, for example, a CPU, a ROM, a RAM, and the like.

The liquid crystal driving device 4 is configured to supply a driving voltage to the liquid crystal element 5 on the basis of the control signal supplied from the control device 3 so as to individually control the alignment state of the liquid crystal layer in each pixel region of the liquid crystal element 5.

The liquid crystal element 5 has, for example, a plurality of individually controllable pixel regions, i.e., light modulation regions, and the transmittance of each pixel region is variably set in accordance with the magnitude of the voltage applied to the liquid crystal layer by the liquid crystal driving device 4. By irradiating the liquid crystal element 5 with the light from the light source 1, an image having bright/dark areas corresponding to the light irradiation range and the non-irradiation range can be formed. For example, the liquid crystal element 5 includes a vertically aligned liquid crystal layer, and is disposed between the pair of polarizing plates 6a and 6b so as to be arranged in a crossed-Nicol manner. In this liquid crystal element 5 with this configuration, when a voltage is not applied to the liquid crystal layer or the applied voltage is equal to or lower than a threshold value, the light transmittance is in an extremely low state, i.e., the liquid crystal element 5 is in a light-shielding state, and when a certain voltage is applied to the liquid crystal layer, the light transmittance is in a relatively high state, i.e., the liquid crystal element 5 is in a light-transmitting state.

The pair of polarizing plates 6a and 6b have their polarization axes substantially perpendicular to each other, for example, and are disposed to face each other with the liquid crystal element 5 interposed therebetween. In the present exemplary embodiment, it is assumed that the normally closed mode is an operation mode in which light is shielded, i.e., the transmittance is extremely low, when no voltage is applied to the liquid crystal layer. As the polarizing plates 6a and 6b, for example, an absorption-type polarizing plate made of a common organic material (iodine-based and dye-based materials) may be adopted. In addition, when it is desired to emphasize heat resistance, it is also preferable to use a wire grid-type polarizing plate. The wire grid-type polarizing plate is a polarizing plate formed by arranging extra-fine wires made of metal such as aluminum. Alternatively, an absorption-type polarizing plate and a wire grid-type polarizing plate may be superimposed on each other.

The projection lens 7 projects an image formed by light passing through the liquid crystal element 5 (an image having bright/dark areas corresponding to the light irradiation range and the non-irradiation range) toward the area in front of the own vehicle by spreading the image into a headlight light distribution. As the projection lens 7, a lens or lenses appropriately designed for the intended use applications can be adopted. In the present exemplary embodiment, an inverted projection-type projector lens is used.

Figure 2A:
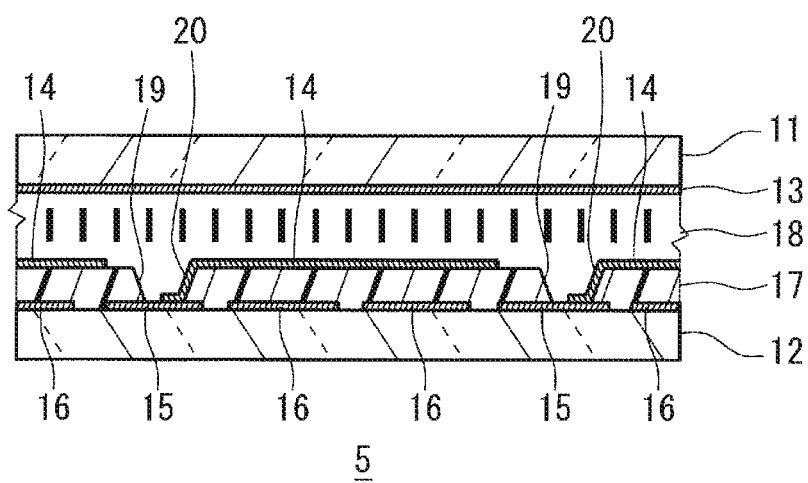
FIGS. 2A and 2B are schematic cross-sectional views showing a configuration of a liquid crystal element adopted in the vehicular headlamp system according to the present exemplary embodiment of the present invention.
Figure 2B:
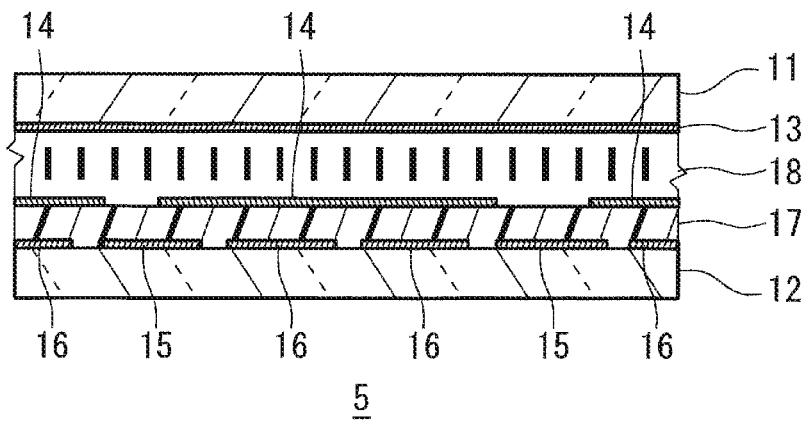
Figure 3:
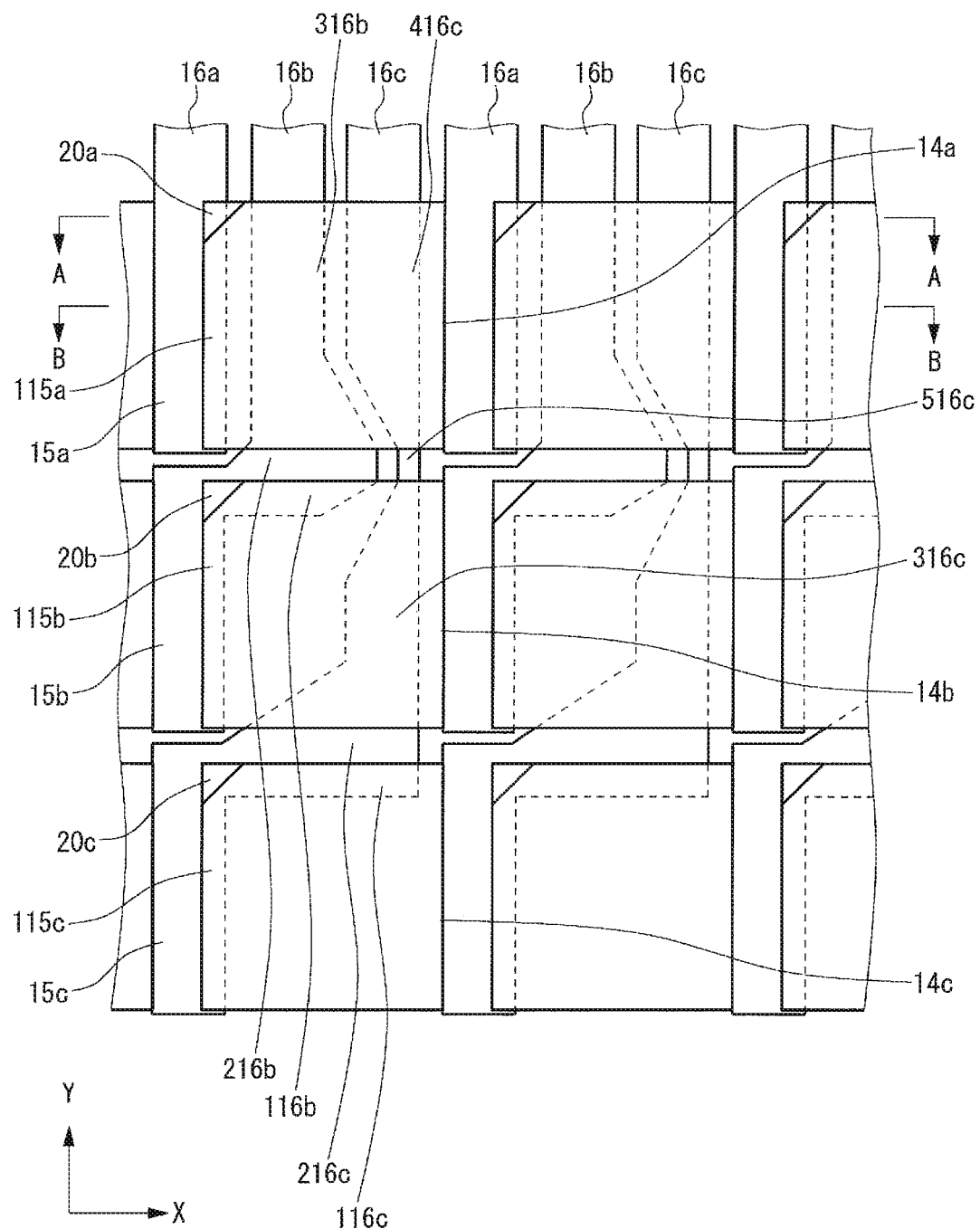
FIG. 3 is a schematic plan view showing a configuration of the liquid crystal element.

FIGS. 2A and 2B are schematic cross-sectional views showing a configuration of a liquid crystal element adopted in the vehicular headlamp system. FIG. 3 is a schematic plan view showing the configuration of the liquid crystal element. Note that the cross-sectional view shown in FIG. 2A corresponds to a partial cross-sectional view taken along line A-A shown in FIG. 3, and the cross-sectional view shown in FIG. 2B corresponds to a partial cross-sectional view taken along line B-B shown in FIG. 3. The liquid crystal element 5 is configured to include an upper substrate (first substrate) 11 and a lower substrate (second substrate) 12 which are disposed in an opposite manner, and further include: a common electrode (counter electrode) 13 which is provided to the upper substrate 11; a plurality of pixel electrodes 14, a plurality of inter-pixel electrodes 15, a plurality of wiring portions 16, and an insulating layer 17, which are provided to the lower substrate 12; and a liquid crystal layer 18 which is disposed between the upper substrate 11 and the lower substrate 12. Although illustration is omitted for convenience of explanation, an alignment film for regulating the alignment state of the liquid crystal layer 18 is appropriately provided on each of the upper substrate 11 and the lower substrate 12.

Each of the upper substrate 11 and the lower substrate 12 is a rectangular substrate in plan view, and is disposed so as to face each other. Examples of such a substrate that can be used may include transparent substrates such as a glass substrate and a plastic substrate. A large number of spacers may be uniformly dispersed and arranged between the upper substrate 11 and the lower substrate 12, so that the gap between the substrates can be maintained at a desired distance, for example, about several μm.

The common electrode 13 is provided on one of the surfaces of the upper substrate 11. The common electrode 13 is integrally provided so as to face the respective pixel electrodes 14 of the lower substrate 12. The common electrode 13 is formed by appropriately patterning a transparent conductive film such as indium tin oxide (ITO).

Figure 4:
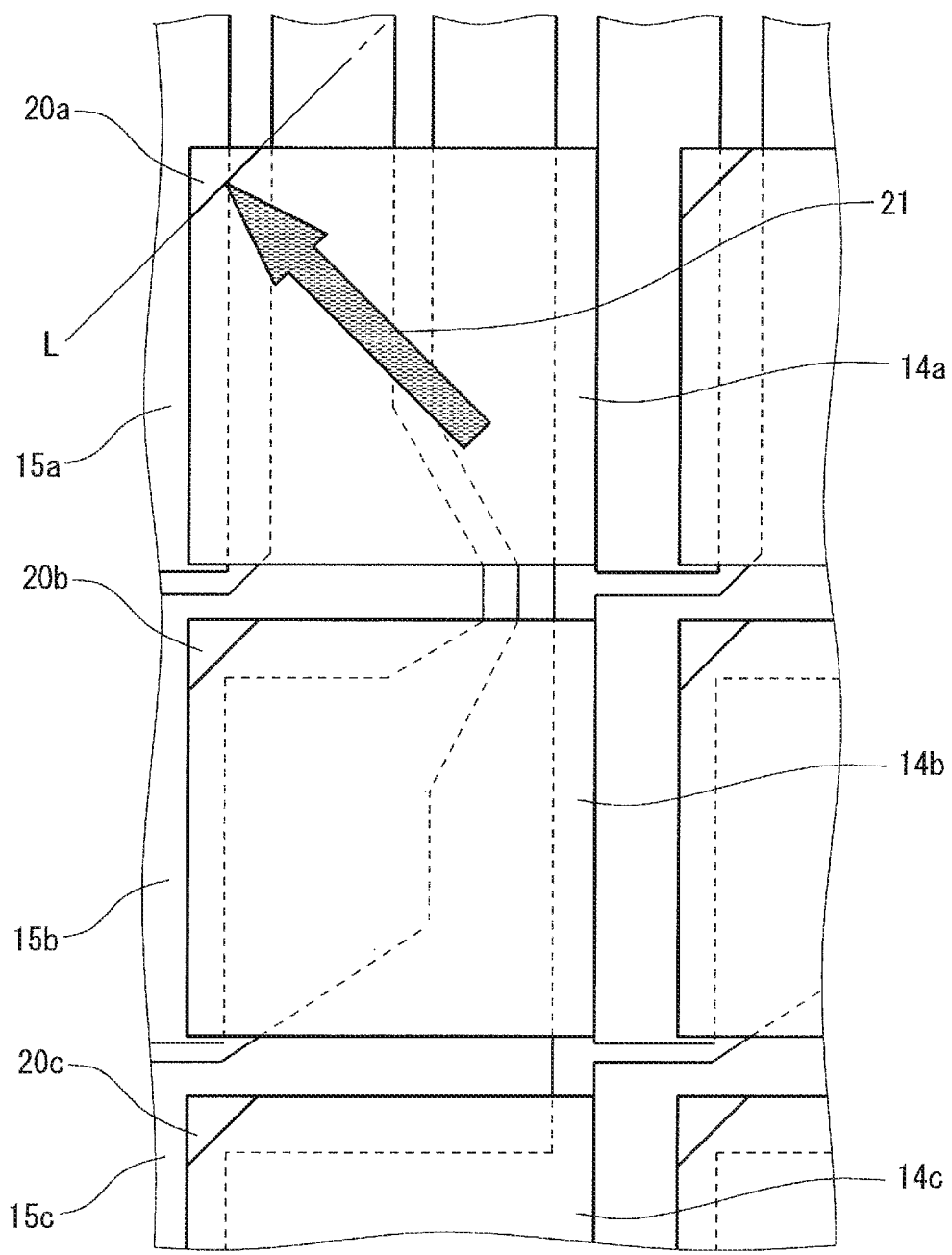
FIG. 4 is a diagram for explaining the relationship between the shape of the connection portion of each pixel electrode and the alignment treatment direction.

The plurality of pixel electrodes 14 are provided on the upper side of the insulating layer 17 on one surface side of the lower substrate 12. The pixel electrodes 14 are formed by appropriately patterning a transparent conductive film such as indium tin oxide (ITO). As shown in FIG. 4, each of the pixel electrodes 14 has, for example, a square or substantially square outer shape in plan view, and the pixel electrodes 14 are arranged in a matrix along the x direction and the y direction. A gap is provided between the adjacent pixel electrodes 14. Each of the regions where the common electrode 13 overlaps with each of the pixel electrodes 14 constitutes the above-mentioned pixel region (light modulation region).

The plurality of inter-pixel electrodes 15 are provided on the lower side of the insulating layer 17 on the one surface side of the lower substrate 12. These inter-pixel electrodes 15 are formed by appropriately patterning a transparent conductive film such as indium tin oxide (ITO). As shown in FIG. 4, each inter-pixel electrode 15 has, for example, a rectangular outer shape in plan view, and is disposed so as to overlap a gap between two pixel electrodes 14 adjacent to each other in the x direction in the drawing.

The plurality of wiring portions 16 are provided on the lower side of the insulating layer 17 on the one surface side of the lower substrate 12. The wiring portions 16 are formed by appropriately patterning a transparent conductive film such as indium tin oxide (ITO). Each of the wiring portions 16 is used for applying a voltage from the liquid crystal driving device 4 to each of the pixel electrodes 14.

The insulating layer 17 is provided on the one surface side of the lower substrate 12 so as to cover the inter-pixel electrodes 15 and the wiring portions 16 from above. The insulating layer 17 is, for example, formed of an $SiO_2$ film or an SiON film by a gas phase process such as a sputtering method or a solution process.

The liquid crystal layer 18 is provided between the upper substrate 11 and the lower substrate 12. In the present exemplary embodiment, the liquid crystal layer 18 is formed using a nematic liquid crystal material having a negative dielectric anisotropy $\Delta\varepsilon$ and fluidity, and including a chiral material. The liquid crystal layer 18 of the present exemplary embodiment is set so that the alignment directions of the liquid crystal molecules at the time of no voltage application are inclined in one direction, and the liquid crystal molecules are aligned substantially vertically with a pretilt angle within a range of 88° or more and less than 90° with respect to the respective substrate surfaces, for example.

As described above, an alignment film is provided on each of the one surface side of the upper substrate 11 and the one surface side of the lower substrate 12. As the alignment film, a vertical alignment film that regulates the alignment state of the liquid crystal molecules in the liquid crystal layer 18 to vertical alignment is used. Each of the alignment films is subjected to a uniaxial alignment treatment such as a rubbing treatment, so that the alignment film has a uniaxial alignment regulating force for regulating the alignment of the liquid crystal molecules of the liquid crystal layer 18 in a certain direction. The direction of the alignment treatment on each of the alignment films is set to be, for example, in an alternate fashion (antiparallel).

The liquid crystal element 5 of this exemplary embodiment has several tens to several hundreds of pixel regions, which are regions defined as regions in each of which the common electrode 13 and each of the pixel electrodes 14 overlap each other in plan view, and these pixel regions are arranged in a matrix. In the present exemplary embodiment, the shape of each pixel region is configured to be, for example, a square shape, but the shape of each pixel region may be arbitrarily set, such as a mixture of a rectangular shape and a square shape. The common electrode 13, each pixel electrode 14, and each inter-pixel electrode 15 are connected to the liquid crystal driving device 4 via each wiring portion 16 and the like, and are statically driven.

Referring back to FIG. 3, the structure of each pixel electrode 14, each inter-pixel electrode 15, and each wiring portion 16 will be described in detail. In this exemplary embodiment, the pixel electrodes 14 are arranged in three rows along the y-direction and are arranged in any number along the x-direction. Here, for the respective pixel electrodes 14, those located in the first, second, and third rows are referred to as a pixel electrode 14a, a pixel electrode 14b, and a pixel electrode 14c, respectively, in order from the top in the drawing. Also for the inter-pixel electrodes 15, those corresponding to the pixel electrodes 14*a* in the first row, the pixel electrodes 14*b* in the second row, and the pixel electrodes 14*c* in the third row are referred to as inter-pixel electrodes 15*a*, inter-pixel electrodes 15*b*, and inter-pixel electrodes 15*c*, respectively. Further, for the wiring portions 16, those corresponding to the pixel electrodes 14*a* and the inter-pixel electrodes 15*a* in the first row, the pixel electrodes 14*b* and the inter-pixel electrodes 15*b* in the second row, and the pixel electrodes 14*c* and the inter-pixel electrodes 15*c* in the third row are referred to as wiring portions 16*a*, wiring portions 16*b*, and wiring portions 16*c*, respectively.

Each pixel electrode 14*a* is connected to the inter-pixel electrode 15*a* and the wiring portion 16*a* on the lower layer side through a through hole 19 provided in the insulating layer 17. As a result, the pixel electrode 14*a*, the inter-pixel electrode 15*a*, and the wiring portion 16*a* are brought to the same potential. As shown in FIG. 3, each of the through holes 19 has an outer edge shape of a substantially triangular shape in plan view, and is provided in association with one of four corners of each of the pixel electrodes 14*a* in plan view. In the illustrated example, the through hole 19 is located at the upper left corner. Each pixel electrode 14*a* has a connection portion 20*a* formed along the wall surface of the through hole 19. The connection portion 20*a* is in contact with a portion of the lower inter-pixel electrode 15*a* and wiring portion 16*a* exposed at the bottom of the through hole 19.

Similarly, each pixel electrode 14*b* has a connection portion 20*b* formed along the wall surface of the through hole 19, and is connected to the inter-pixel electrode 15*b* and the wiring portion 16*b* on the lower layer side. As a result, the pixel electrode 14*b*, the inter-pixel electrode 15*b*, and the wiring portion 16*b* are brought to the same potential. Similarly, each pixel electrode 14*c* has a connection portion 20*c* formed along the wall surface of the through hole 19, and is connected to the inter-pixel electrode 15*c* and the wiring portion 16*c* on the lower layer side. As a result, the pixel electrode 14*c*, the inter-pixel electrode 15*c*, and the wiring portion 16*c* are brought to the same potential.

Each of the inter-pixel electrodes 15*a* is disposed so as to fill a space between two pixel electrodes 14*a* adjacent to each other in the x direction in plan view. In this exemplary embodiment, each of the inter-pixel electrodes 15*a* is disposed such that its left outer edge in plan view and the right outer edge of the pixel electrode 14*a* disposed on its left side are substantially at the same position as seen in the vertical direction.

Further, each of the inter-pixel electrodes 15*a* is disposed so that a partial region (first region) 115*a* inside from the right edge of the inter-pixel electrode 15*a* in plan view partially overlaps a partial region in the vicinity of the left outer edge of the pixel electrode 14*a* disposed on the right side of the inter-pixel electrode 15*a*. These partial regions 115*a* have an effect of preventing the occurrence of an oblique electric field in the vicinity of the left outer edge of the pixel electrode 14*a* in the drawing, whereby suppressing the occurrence of a dark region. Therefore, it is preferable that the length of each partial region 115*a* in the y direction is as large as possible, and in this exemplary embodiment, the length of the partial region 115*a* in the y direction is set to be substantially the same as the length of the corresponding pixel electrode 14*a* in the y direction.

Similarly, each of the inter-pixel electrodes 15*b* is disposed between two pixel electrodes 14*b* adjacent to each other in the x direction in plan view, and a partial region (first region) 115*b* is disposed so as to partially overlap with the pixel electrode 14*b* on the right side thereof. Similarly, each of the inter-pixel electrodes 15*c* is disposed between two pixel electrodes 14*c* adjacent to each other in the x direction in plan view, and a partial region (first region) 115*c* is disposed so as to partially overlap with the pixel electrode 14*c* on the right side thereof.

In the drawing, the lower end portions of the inter-pixel electrodes 15*a*, 15*b*, and 15*c* are drawn so as to protrude slightly below the lower end portions of the pixel electrodes 14*a*, 14*b*, and 14*c*, but in actuality, the respective lower end portions may be aligned. Further, each of the inter-pixel electrodes 15*a*, 15*b*, and 15*c* may not reach the lower end of each of the pixel electrodes 14*a*, 14*b*, and 14*c* to some extent. For example, the width (length) of each of the inter-pixel electrodes 15*a*, 15*b*, and 15*c* may be 80% or more of the width (length) of each of the pixel electrodes 14*a*, 14*b*, and 14*c*.

Each wiring portion 16*a* is connected to one of the inter-pixel electrodes 15*a*, and extends upward in the drawing. In this exemplary embodiment as illustrated, each wiring portion 16*a* is integrally provided to the corresponding inter-pixel electrode 15*a* while having the same width as that of the corresponding inter-pixel electrode 15*a*. Each wiring portion 16*a* is connected to the liquid crystal driving device 4.

Each wiring portion 16*b* is connected to one of the inter-pixel electrodes 15*b*, and extends upward in the drawing. Each wiring portion 16*b* is connected to the liquid crystal driving device 4. In this exemplary embodiment, each wiring portion 16*b* has, in plan view, a partial region (second region) 116*b* partially overlapping with the pixel electrode 14*b* adjacent to the inter-pixel electrode 15*b*, which is connected thereto in the x direction, a partial region (third region) 216*b* disposed between the pixel electrode 14*b* and the pixel electrode 14*a* adjacent thereto in the y direction, and a partial region 316*b* disposed overlapping with the pixel electrode 14*a*. The partial regions 116*b*, 216*b*, and 316*b* are integrally provided.

Each partial region 116*b* of each wiring portion 16*b* has an effect of suppressing the occurrence of a dark region in the vicinity of the upper outer edge of the pixel electrode 14*b* in the drawing, similarly to the partial region 115*b* described above. In order to achieve this, it is preferable that the width in the x direction of each partial region 116*b* be as broad as possible, for example having a width of 50% or more of the width of the corresponding pixel electrodes 14*a* and 14*b*. In the illustrated example, the width of each partial region 216*b* is approximately 70% of the width of the corresponding pixel electrodes 14*a* and 14*b*.

Each partial region 216*b* of each wiring portion 16*b* also functions as an inter-pixel electrode disposed between two pixel electrodes 14*a* and 14*b* adjacent to each other in the y direction. In order to achieve this, the length of each partial region 216*b* in the x direction is preferably as long as possible, and for example, it is preferable that the length be 50% or more of the length in the x direction of the corresponding pixel electrodes 14*a* and 14*b*. In the illustrated example, the width of each partial region 216*b* is approximately 70% of the length in the x direction of the corresponding pixel electrodes 14*a* and 14*b*. The provision of such a partial region 216*b* can expand a region which substantially functions as a pixel region.

Each wiring portion 16*c* is connected to one of the inter-pixel electrodes 15*c*, and extends upward in the drawing. Each wiring portion 16*c* is connected to the liquid crystal driving device 4. In this exemplary embodiment, each wiring portion 16c has, in plan view, a partial region (second region) 116c partially overlapping with the pixel electrode 14c adjacent to the inter-pixel electrode 15c connected to the wiring portion 16c in the x direction, a partial region (third region) 216c disposed between the pixel electrode 14c and the pixel electrode 14b adjacent thereto in the y direction, a partial region 316c disposed while overlapping with the pixel electrode 14b with the insulating layer 17 interposed therebetween, a partial region 416c disposed while overlapping with the pixel electrode 14a adjacent thereto in the y direction with the insulating layer 17 interposed therebetween, and a connection region 516c disposed between the pixel electrode 14a and the pixel electrode 14b and connecting the partial region 316c and the partial region 416c. The partial regions 116c, 216c, 316c, and 416c and the connection region 516c are integrally provided.

Like the partial region 115c described above, each partial region 116c of each wiring portion 16c has an effect of suppressing the occurrence of a dark region in the vicinity of the upper outer edge of the pixel electrode 14c in the drawing. In order to achieve this, it is preferable that the length of each partial region 116c in the x direction is as long as possible, and for example, it is preferable that the length be 50% or more of the length in the x direction of the corresponding pixel electrodes 14b and 14c. In the illustrated example, the length of each partial region 116c is approximately 87% of the length of the corresponding pixel electrodes 14b and 14c in the x direction.

Each partial region 216c of each wiring portion 16c also functions as an inter-pixel electrode disposed between two pixel electrodes 14b and 14c adjacent to each other in the y direction. In order to achieve this, it is preferable that the length of each partial region 216c in the x direction is preferably as long as possible, and for example it is preferable that the length be 50% or more of the length in the x direction of the corresponding pixel electrodes 14b and 14c. In the illustrated example, the length of each partial region 216c is approximately 87% of the length of the corresponding pixel electrodes 14b and 14c in the x direction. The provision of such a partial region 216c can expand a region which substantially functions as a pixel region.

The patterns of the inter-pixel electrodes 15 and the wiring portions 16 may be designed so that the inter-pixel electrodes 15 and the wiring portions 16 overlap (occupy) 80% or more of the entire region defined by the gaps between the individual pixel electrodes 14. That is, the inter-pixel electrodes 15 and the wiring portions 16 may overlap the area of 80% or more of the entire area defined in the gaps between the individual pixel electrodes 14. As a result, it is possible to suppress the occurrence of a dark region in the vicinity of the peripheral edge of each pixel electrode 14 in the entire element (display region).

FIG. 4 is a diagram for explaining the relationship between the shape of the connection portion of each pixel electrode and the alignment treatment direction. Like FIG. 3, each pixel electrode and the like are shown in plan view. Herein, the "alignment treatment" refers to a treatment (uniaxial alignment treatment) for giving an alignment regulating force (uniaxial alignment regulating force) to an alignment film in one direction, such as a rubbing treatment or a photo-alignment treatment, for example. The alignment treatment direction is a direction in which the above-mentioned alignment treatment is performed, and usually substantially coincides with a direction in which a uniaxial alignment regulating force is generated. As described above, the through hole 19 in which the connection portion 20a of each pixel electrode 14a is provided has a substantially triangular outer edge. In this exemplary embodiment, the direction L of the outer edge of the connection portion 20a disposed so as to intersect with both the left outer edge and the upper outer edge of the pixel electrode 14a in the drawing is a direction that forms an angle of approximately 45° with respect to both the xy directions as shown in the drawing. With respect to the direction L of the outer edge, the alignment treatment direction 21 crosses the direction L, which is substantially orthogonal in this exemplary embodiment, and is set to be a direction from the inside of the pixel electrode 14a toward the outer edge of the connection portion 20a. The relationship between each of the connection portions 20b and 20c of the pixel electrodes 14b and 14c and the alignment treatment direction 21 is the same. The following will describe the reason why it is preferable to set the alignment treatment direction 21 in this manner.

Figure 5A:
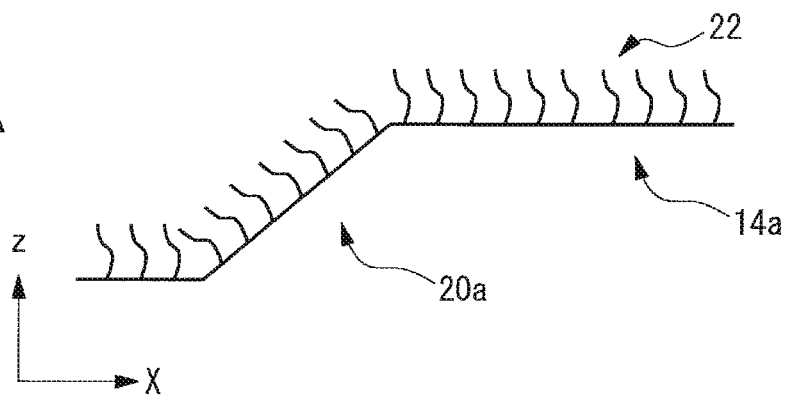
FIGS. 5A to 5C are diagrams for explaining the relationship between each connection portion and the alignment treatment direction.
Figure 5B:
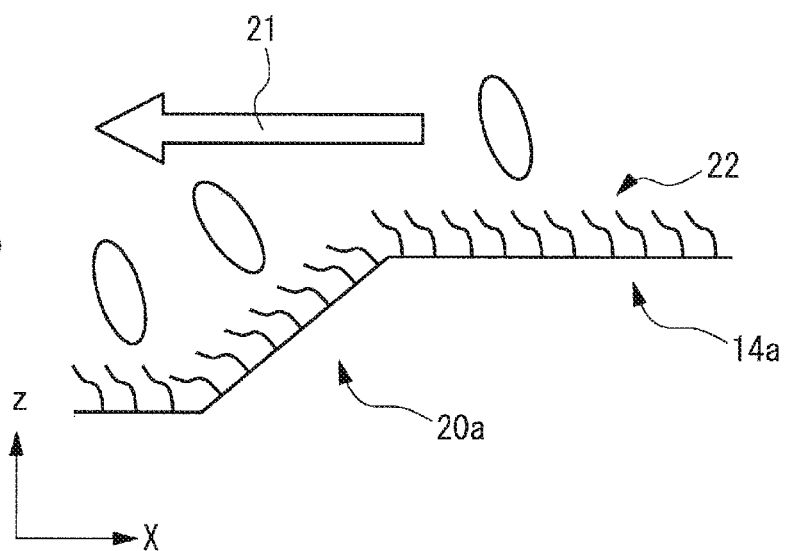
Figure 5C:
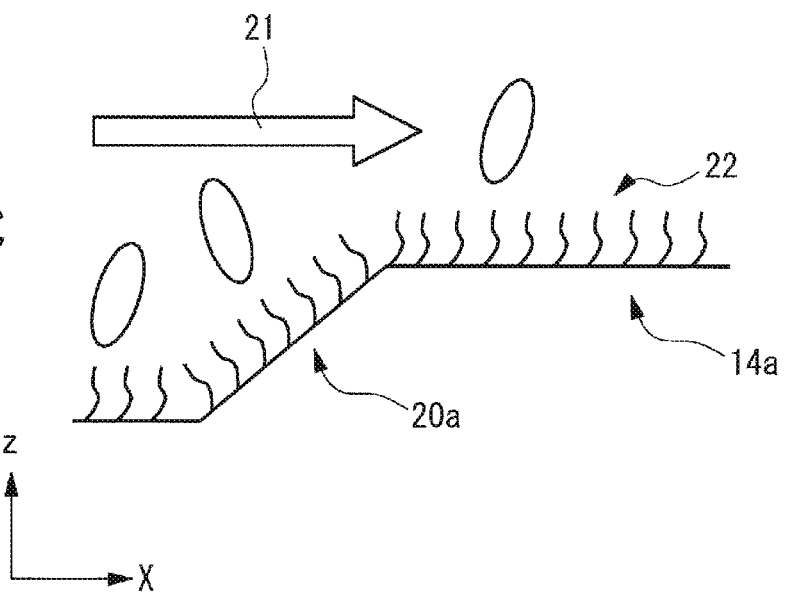

FIGS. 5A to 5C each are a diagram for explaining the relationship between each connection portion and the alignment treatment direction. The state of the alignment film at the connection portion of each pixel electrode and the surface in the vicinity thereof is schematically shown. FIG. 5A shows a state before the alignment treatment. As shown in the drawing, for example, in the connection portion 20a and its vicinity, the side chains 22 of the alignment film rise from the surface. At this time, since the rising directions of the side chains 22 change depending on the surface shape, the side chains 22 rise upward with respect to the inclined surface at a point along the through hole 19 of the connection portion 20a.

FIG. 5B shows a state of the alignment film in the case where the alignment treatment direction 21 is set to the preferable state shown in FIG. 4 and the alignment treatment (rubbing treatment) is performed. In this case, since the alignment treatment is performed in the direction from the right to the left in the drawing, the side chain 22 is also inclined somewhat in that direction. At this time, when viewed from the y direction in the drawing as a reference, the side chains 22 are inclined to the left side in any portion in the drawing, so that the alignment directions of the liquid crystal molecules regulated by the side chains 22 are inclined to the left side in the drawing in any portion. Therefore, the occurrence of a disclination line in the vicinity of the connection portion 20a can be prevented.

FIG. 5C shows a comparative example, illustrating a state of an alignment film in the case where the alignment treatment direction 21 is set in a direction opposite to the preferable state shown in FIG. 4 and the alignment treatment (rubbing treatment) is performed. In this case, since the alignment treatment is performed in the direction from the left to the right in the drawing, the side chains 22 are also inclined somewhat in that direction. At this time, when viewed from the y direction in the drawing as a reference, the side chains 22 are inclined to the right side in the drawing in the flat portion of the pixel electrode 14a, while the side chains are still inclined to the left side in the drawing in the inclined surface portion of the connection portion 20a. Therefore, the alignment direction of the liquid crystal molecules is reversed in the vicinity of the connection portion 20a and its vicinity, and a disclination line generated is noticeable at the boundary thereof. The generation of such a disclination line leads to deterioration of the quality of the light distribution pattern to be formed.

FIG. 6 is a graph showing transmittance characteristics of some samples of the liquid crystal elements. Herein, various conditions other than the cell thickness and the presence or absence of addition of a chiral material to the liquid crystal material were common, and a sample in which the arrangement of a pair of polarizing plates was set as described above was prepared and its transmittance characteristics were measured. As for the vertical alignment film, a film of a type having a rigid skeleton in the side chain (one having liquid crystal properties) was used, and the film with a thickness of about 500 to 800 angstrom by flexographic printing was subjected to firing at 160 to 250° C. for 1 to 1.5 hours. For the rubbing treatment, the pushing amount was set to 0.3 to 0.8 mm. The direction of the rubbing treatment was set to anti-parallel. As the liquid crystal material, a material having a dielectric anisotropy Δε of −4.4 and a refractive index anisotropy Δn of about 0.13 was used.

The characteristic line a shown in FIG. 6 is a sample with a cell thickness of 6 μm and added with a chiral material, the characteristic line b is a sample with a cell thickness of 3 μm and added with no chiral material, the characteristic line c is a sample with a cell thickness of 6 μm and added with no chiral material, and the characteristic line d is a sample with a cell thickness of 4 μm and added with no chiral material. In the liquid crystal element showing the characteristic line a and the liquid crystal element showing the characteristic line b, the transmittance does not decrease even when the applied voltage increases, and is substantially constant. On the other hand, in the liquid crystal element showing the characteristic line c, the transmittance that once has increased with an increase in the applied voltage gradually decreases with a further increase in the applied voltage. In addition, in the liquid crystal element showing the characteristic line d, the transmittance is saturated at around 3.8 V of the applied voltage, and the transmittance is rapidly decreased at a voltage higher than that applied voltage. FIG. 7 shows chromaticity changes of samples showing the characteristic line a and the characteristic line c. Although the chromaticity hardly changes in the sample showing the characteristic line a regardless of the voltage change, the chromaticity largely changes in the sample showing the characteristic line c. The result of the sample showing the characteristic line b was the same as that of the sample showing the characteristic line a.

Herein, in the liquid crystal element 5 of this exemplary embodiment, the magnitude of the effective applied voltage to the liquid crystal layer 18 is different in each of the region to which the voltage is applied to the liquid crystal layer 18 from each pixel electrode 14 (hereinafter referred to as the "first region") and the region to which the voltage is applied to the liquid crystal layer 18 from each inter-pixel electrode 15 (hereinafter referred to as the "second region"). This is due to the presence or absence of the insulating layer 17. In the second region, since the insulating layer 17 is interposed between the inter-pixel electrode 15 and the liquid crystal layer 18, the applied voltage is divided into the insulating layer 17 and the liquid crystal layer 18. Therefore, it is desirable to apply a necessary and sufficient voltage to both the first region and the second region by using a liquid crystal element such as samples showing the characteristic lines a and b in FIG. 8, having a wider range in which the transmittance can be regarded as substantially constant with respect to the applied voltage, as the liquid crystal element 5, and by setting a relatively high applied voltage (for example, a voltage equal to or higher than 1.5 times the threshold). Herein, "a range in which the transmittance can be regarded as substantially constant" means, for example, a range in which the transmittance falls within a variation of ±3%.

A discussion will next be given of the difference between the effective applied voltages in the first region and the second region. The second region can be regarded as a series connection of the capacitive component of the liquid crystal layer 18 and the capacitive component of the insulating layer 17. That is, it can be regarded as a series connection of two capacitors.

The capacitive component $C_{LC}$ by the liquid crystal layer 18 can be expressed as follows, where $\varepsilon_{LC}$ is the dielectric constant of the liquid crystal material (minor axis direction), S is the area of the liquid crystal material, and $d_{LC}$ is the layer thickness of the liquid crystal layer 18. Similarly, the capacitive components $C_{top}$ by the insulating layer 17 can be expressed as follows, where $\varepsilon_{top}$ is the dielectric constant of the insulating layer 17, S is the area of the insulating layer 17, and $d_{top}$ is the layer thickness of the insulating layer 17.

$$C_{LC}=\varepsilon_{LC} \times S/d_{LC}$$

$$C_{top}=\varepsilon_{top} \times S/d_{top}$$

Since the capacitors are connected in series and the charges Q are common, the charges Q can be expressed as follows when the voltage applied to the liquid crystal layer 18 is denoted by $V_{LC}$ and the voltage applied to the insulating layer 17 is denoted by $V_{top}$.

$$Q=C_{LC} \times V_{LC}$$

$$Q=C_{top} \times V_{top}$$

For example, in a liquid crystal element having a cell thickness of 6 μm, assuming that $d_{LC}$ of the liquid crystal layer 18 is 5 μm and $\varepsilon_{LC}$ thereof is 8.0, and $d_{top}$ of the insulating layer 17 is 1 μm and $\varepsilon_{top}$ thereof is 3.44, the respective capacitive components can be expressed as follows.

$$C_{LC}=8.0 \times S/5=1.6 \times S$$

$$C_{top}=3.44 \times S/1=3.44 \times S$$

Then, $V_{LC}:V_{top}=1/C_{LC}:1/C_{top}=1/1.6:1/3.44$, and thus, $$V_{LC}:V_{top}=1.96:1$$

As described above, in the above numerical example, the voltage dividing ratio of the liquid crystal layer 18 and the insulating layer 17 is 1.96:1, which is approximately 2:1. That is, in the "first region" where a voltage is applied from each pixel electrode 14 to the liquid crystal layer 18, the applied voltage is basically applied as it is because the insulating layer 17 is not present; however in the second region where a voltage is applied from the inter-pixel electrode 15, a voltage obtained by dividing the applied voltage by 2:1 is applied to the liquid crystal layer 18. Therefore, in order to prevent a difference in transmittance between the first region and the second region, it is desirable to apply a relatively high applied voltage while using the liquid crystal element 5 having a wide range in which the transmittance can be regarded as substantially constant as described above. For example, if the applied voltage is set to 7 V in the liquid crystal element showing the characteristic line a shown in FIG. 6, the voltage of 7 V is applied in the first region of the liquid crystal layer 18, and the voltage of approximately 4.7 V which is a divided voltage is applied in the second region, so that the transmittance can be equalized in any region.

In other words, it can be said that the liquid crystal element 5 may preferably be configured to have a transmittance characteristic such that the transmittance by the voltage applied to the liquid crystal layer 18 after being divided by the insulating layer 17 and the transmittance by the voltage applied to the liquid crystal layer 18 without being divided by the insulating layer 17 are substantially equal to each other (for example, within an error range of ±3%).

Figure 8:
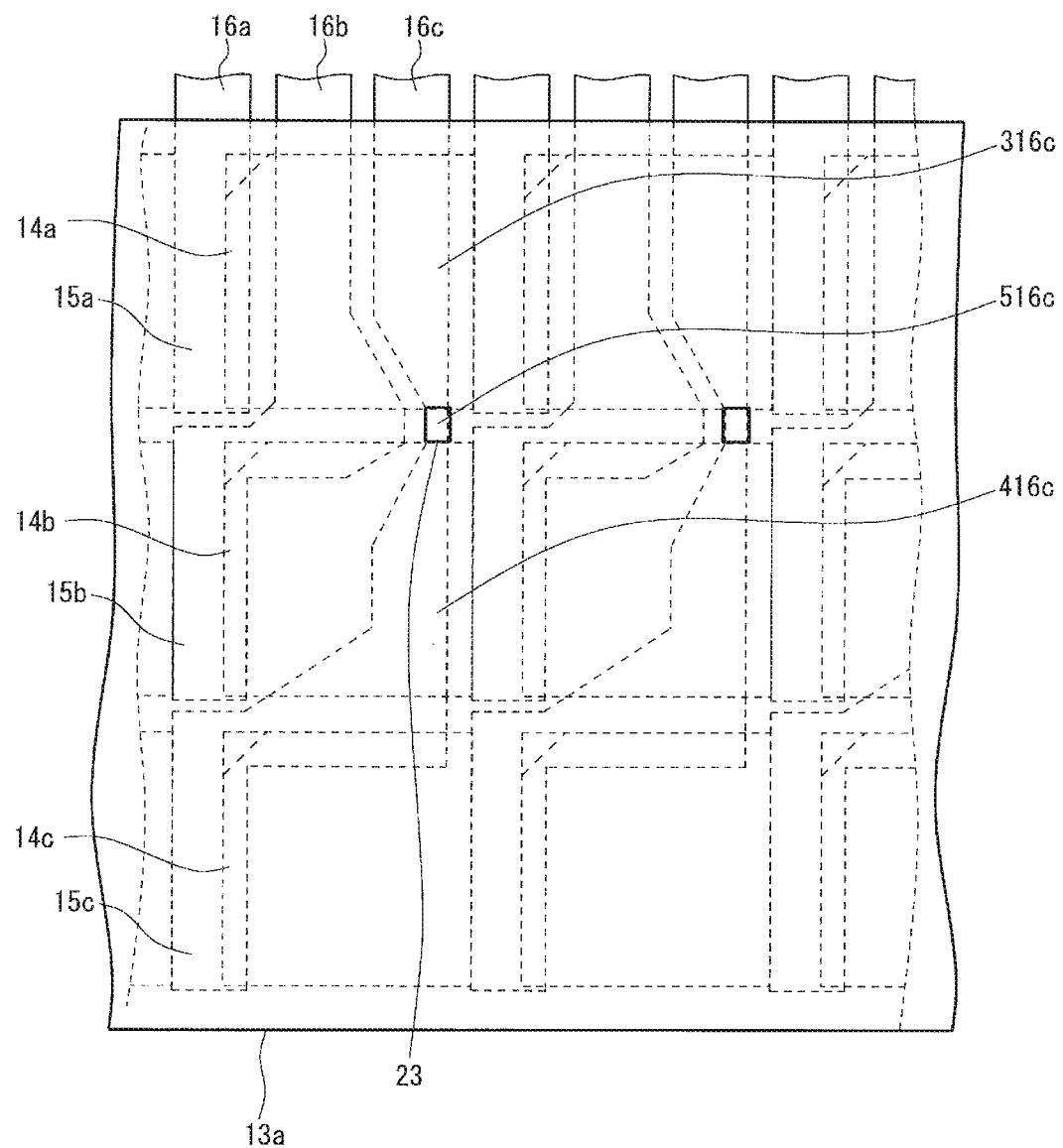
FIG. 8 is a partial plan view for explaining a modified example of a common electrode.

FIG. 8 is a plan view for explaining a modified example of the common electrode. In FIG. 8, the common electrode 13a is superimposed on the pixel electrodes 14a and the like. In the illustrated common electrode 13a, openings 23 are provided in regions corresponding to the respective connection regions 516c of the wiring portions 16c. Although it is desirable that the shape and size of the opening 23 in plan view be substantially the same as those of the connection region 516c, the shape and size may be made somewhat larger than those of the connection region 516c in consideration of formation accuracy and alignment accuracy in manufacturing so that the connection region 516c is included in the opening 23 in plan view. The provision of such an opening 23 can prevent unnecessary light transmission in the connection region 516c.

More specifically, in the case where the opening 23 is not provided, when a voltage is applied to the pixel electrode 14c so that the region is brought into a light transmissive state, the same voltage is also applied to the connection region 516, and thus the connection region 516c is also brought into a light transmissive state. At this time, for example, if each region corresponding to the pixel electrode 14a or the pixel electrode 14b is in a non-transmissive state (or a low transmissive state), it is considered that the light transmissive state of the connection region 516c becomes a state that can be visually recognized as a bright spot. To cope with this, the provision of the opening 23 can avoid the generation of such bright spots. In this case, although the connection region 516c is always in a non-transmissive state and may be visually recognized as a black spot, it is preferable to be a black spot rather than a bright spot because the black spot is less conspicuous in terms of a characteristic of the human eye. Further, as shown in the drawing, the connection region 516c is for electrically connecting the partial region 316c and the partial region 416c, and thus can be formed to have a relatively small size. Therefore, it is possible to achieve a state in which the black dot is virtually invisible.

Figure 9:
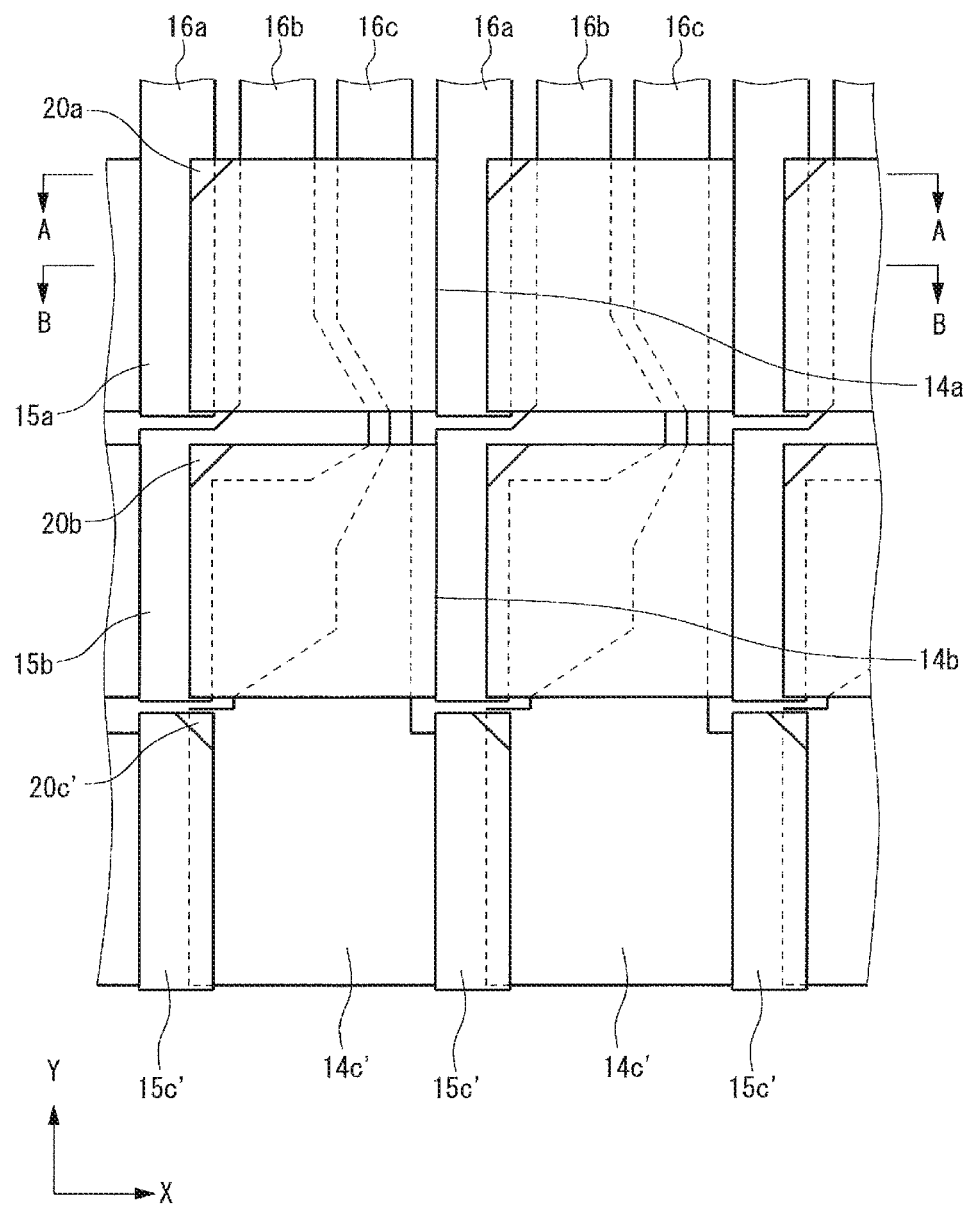
FIG. 9 is a plan view for explaining a modified embodiment of the pixel electrodes and the inter-pixel electrodes.

FIG. 9 is a plan view for explaining a modified embodiment of the pixel electrodes and the inter-pixel electrodes. The illustrated example is different from the above-described embodiment in that the relationship between the pixel electrodes and the inter-pixel electrodes in the third row in the vertical direction is interchanged. Specifically, the respective pixel electrodes 14c' are provided on the lower layer side, the insulating layer 17 (see FIG. 2) is provided so as to cover them, and the respective inter-pixel electrodes 15c' are provided on the upper side of the insulating layer 17. Each of the inter-pixel electrodes 15c' is provided with a connection portion 20c', and the inter-pixel electrodes 15c' and the pixel electrodes 14c' are connected via the connection portions 20c', respectively. The respective wiring portions 16c are connected to the pixel electrodes 14c'. As is clear from this example, the vertical relationship between the pixel electrodes and the inter-pixel electrodes may be interchanged.

Figure 10:
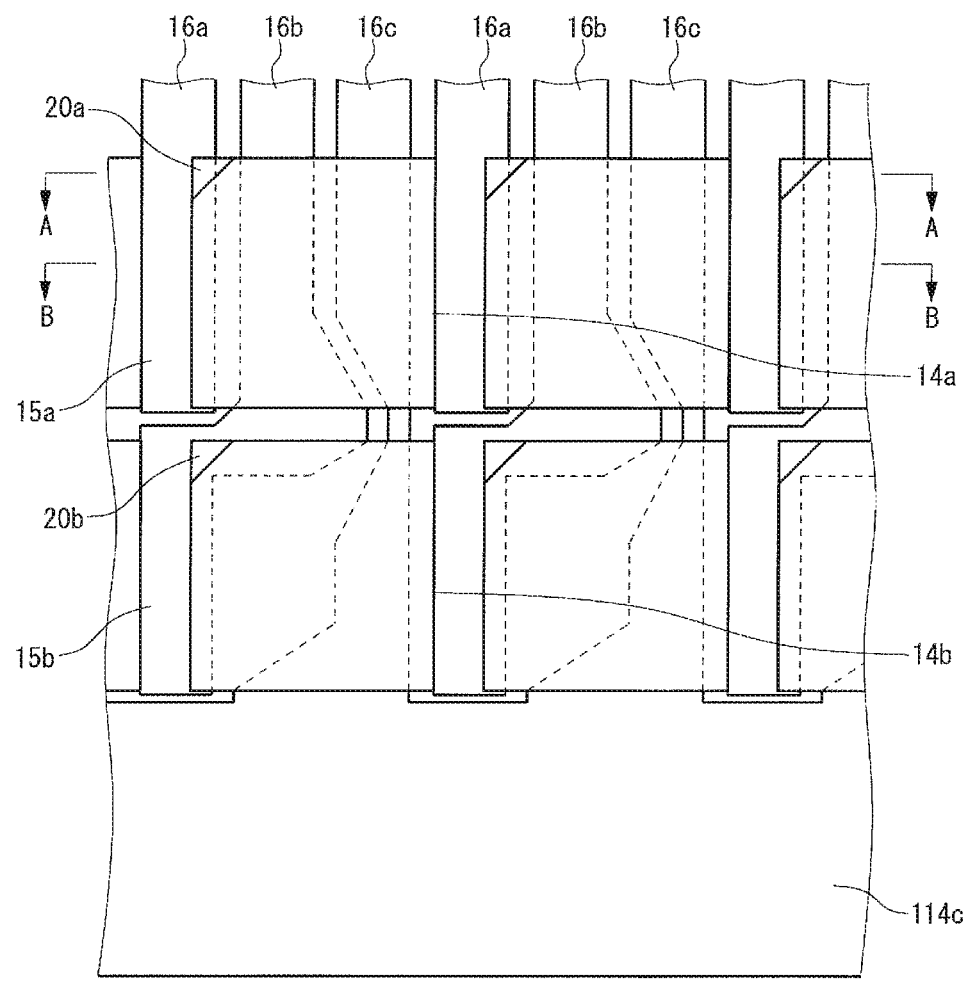
FIG. 10 is a plan view for explaining a modified embodiment of the pixel electrodes.

FIG. 10 is a plan view for explaining a modified embodiment of the pixel electrodes. The illustrated example is different from the aforementioned embodiment in that the pixel electrodes 114c in the third row are integrated and provided on the lower layer side of the insulating layer 17. As in this example, some of the pixel electrodes may be integrated as a unit.

According to each of the embodiments described above, it is possible to improve the appearance of the light distribution pattern in the vehicular lamp system configured to control the light distribution pattern using a liquid crystal element or the like.

Incidentally, in general, the pixel electrode 14 is referred to as a segment electrode. The wiring portion 16 is sometimes referred to as a wiring electrode or a lead-out electrode, and may be regarded as a part of the inter-pixel electrode 15. In addition, the inter-pixel electrode 15 may be regarded as a part of the wiring portion 16.

Figure 11:
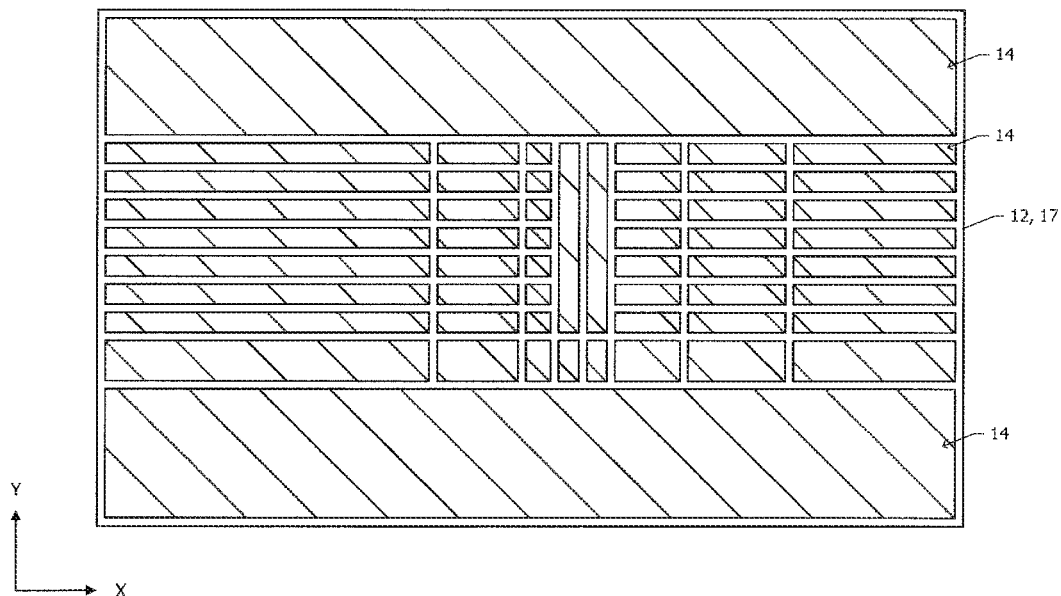
FIGS. 11 and 12 are plan views for explaining another modified embodiment of the pixel electrodes.
Figure 12:
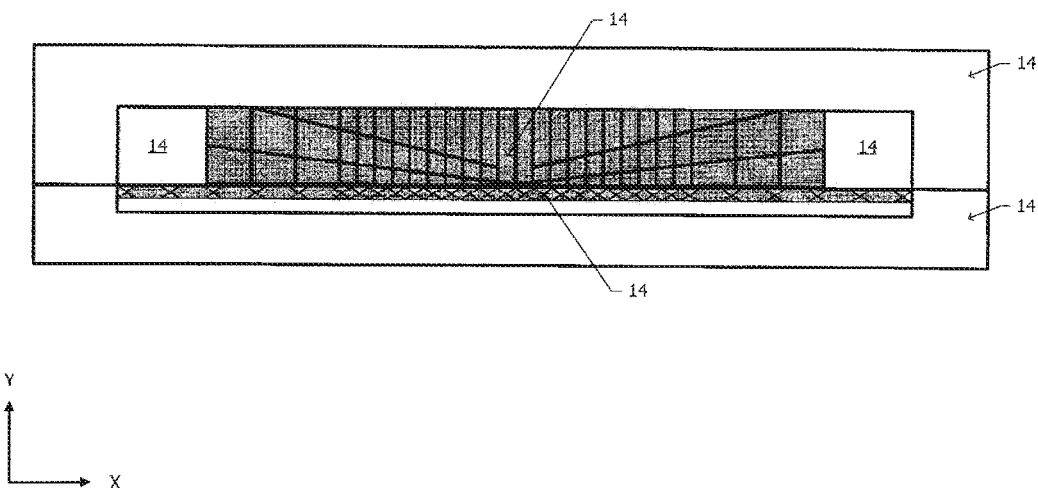

FIGS. 11 and 12 are general plan views for explaining other modified embodiments of the pixel electrodes (segment electrodes). For convenience, the segment electrodes 14 are hatched.

In ADB, AFS, and the like, generally, a finer light distribution control region (e.g., the center of the illumination region) and a coarser light distribution control region (e.g., the periphery of the illumination region) are determined in advance. The size and shape of each of the segment electrodes 14 are adjusted depending on the light irradiation accuracy of the illumination region.

The pixel electrodes (segment electrodes) shown in FIGS. 11 and 12 are examples of pixel electrodes arranged in a matrix. Herein, the matrix means a state in which a plurality of pixels are regularly arranged.

FIG. 11 is an example in which the pixel electrodes are arranged in a lattice shape or a grid shape in the vertical and/or horizontal direction. In the illustrated example, one electrode 14 extending in one direction (X direction) is disposed on one end side and the other end side in the Y direction, respectively, and various sized electrodes 14 having a relatively small size are disposed in the center. The widths of the various electrodes 14 in the Y direction tend to become gradually narrower from the one end side toward the center, and to become wider again from the center toward the other end side.

In addition, in the group of the electrodes 14 disposed in the center in the Y direction, the electrodes 14 having a relatively large size are disposed on the left side and the right side (one end side and the other end side in the X direction), and the electrodes 14 having a relatively small size are disposed in the center. The width of the group of electrodes 14 in the left-right direction (X direction) tends to gradually narrow from the left side toward the center, and to widen again from the center toward the right side.

FIG. 12 shows an example in which the electrodes 14 are arranged radially in an oblique direction. In the illustrated example, in the group of electrodes 14 arranged in the center in the Y direction, the electrodes 14 having a relatively large size are disposed on the left side and the right side (one end side and the other end side in the X direction), and the electrodes 14 having a relatively small size are disposed in the center. The width of the group of electrodes 14 along the left-right direction (X direction) tends to gradually narrow from the left side toward the center, and to widen again from the center toward the right side.

The group of electrodes 14 is divided by a dividing line extending radially, so that various electrodes 14 are disposed so as to extend radially. In the center, the various electrodes 14 of relatively small size are disposed. The various electrodes 14 tend to gradually decrease in size from the periphery towards the center and to widen again from the center towards the periphery.

A vehicular headlamp system using the liquid crystal element 5 having the segment electrodes 14 with a shape optimized for ADB, AFS, or the like, and having the structure (multilayer electrode structure) in which the segment electrodes 14 and the wiring electrodes 16 (and the inter-pixel electrodes 15) are stacked with the insulating layer 17 interposed therebetween has not been developed so far. With the multilayer electrode structure, even if the shape and arrangement of the segment electrodes 14 are complicated as described above, the pattern design of the wiring electrodes 16 (and the inter-electrode electrodes 15) can be easily achieved. In addition, by designing the pattern so that the inter-pixel electrodes 15 or the wiring electrodes 16 are arranged in the gaps between the segment electrodes 14 in plan view (see FIG. 3, etc.), it is possible to suppress the occurrence of dark regions in the vicinity of the peripheral edge of each of the segment electrodes 14 (see FIG. 3, etc.).

Figure 13:
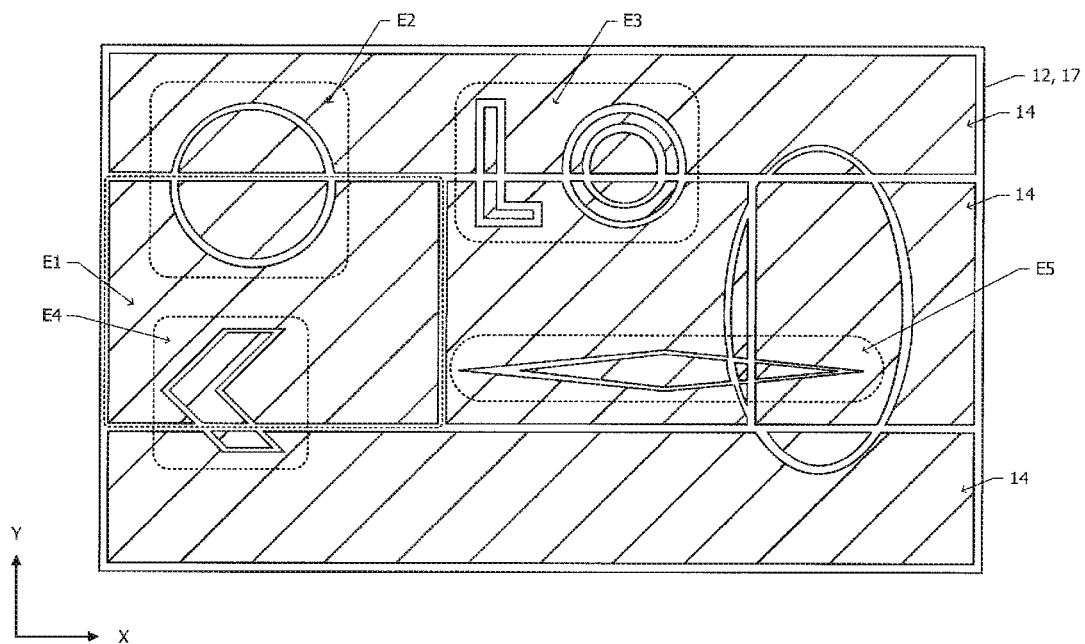
FIG. 13 is a plan view for explaining still another modified embodiment of the pixel electrodes.

FIG. 13 is an overall plan view for explaining still another modified embodiment of the pixel electrodes (segment electrodes). For convenience, the segment electrodes 14 are hatched.

ADB, AFS, and the like have a function of brightly illuminating only a specific illuminated area, for example, a destination guide sign suspended on a road or a pedestrian. The size and shape of the individual segment electrodes 14 are adjusted in accordance with their illumination targets.

In the illustrated example, various electrodes 14 of mutually different shapes are arranged on the insulating layer 17. For example, by applying a voltage to the electrodes 14 accommodated in an electrode region E1 surrounded by a broken line in the drawing, a rectangular projection image can be outputted to the left side of the illumination region. In addition, when a voltage is applied to the electrodes 14 accommodated in an electrode region E2, a circular projection image can be outputted on the upper left side of the illumination region. In addition, a projection image such as a desired character (letters "LO" in an electrode region E3), a figure (arrow and rhombus in electrode regions E4 and E5) or the like can be outputted at a predetermined position of the illumination region.

With the multilayer electrode structure, even if the shape and arrangement of the segment electrodes 14 are complicated as described above, the pattern design of the wiring electrodes 16 (and inter-electrode electrodes 15) can be easily achieved. In addition, by designing patterns so that the inter-pixel electrodes 15 and the wiring electrodes 16 are arranged in the gaps between the segment electrodes 14 in plan view (see FIG. 3, etc.), it is possible to suppress the generation of dark regions in the vicinity of the peripheral edge of each of the segment electrodes 14.

While the present invention has been described above along with exemplary embodiments and examples, the present invention is not limited thereto. For example, although the liquid crystal layer of the liquid crystal element having a vertical alignment has been described in the above-described exemplary embodiments, the configuration of the liquid crystal layer is not limited to this, and other configurations, for example, TN alignment, may be used. Further, a viewing angle compensation plate may be disposed between the liquid crystal element and the polarizing plate.

In the exemplary embodiment described above, an example in which the present invention is applied to a system for selectively irradiating light to the front of a vehicle has been described, but the scope of application of the present invention is not limited to this. For example, the present invention may be applied to a system for irradiating light obliquely to the front of a vehicle in accordance with the traveling direction of the vehicle, a system for adjusting the optical axis of a headlamp in accordance with the inclination of the vehicle in the front-rear direction, a system for electronically switching between a high beam and a low beam of a headlamp, and the like. Furthermore, the present invention may be applied not only to vehicle applications but also to lighting devices in general.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:
1. A vehicular lamp comprising:
a light source configured to emit light that travels in an optical path;
a liquid crystal element disposed on the optical path of the light emitted from the light source, and including a liquid crystal layer and a pair of sandwiching substrates configured to sandwich the liquid crystal layer; and
a projection optical system disposed on an optical path of light having been transmitted through the liquid crystal element,
wherein:
one of the pair of sandwiching substrates in the liquid crystal element includes a first transparent substrate, and a common electrode disposed on the first transparent substrate, and
the other of the pair of sandwiching substrates in the liquid crystal element includes a second transparent substrate, a plurality of wiring electrodes disposed on the second transparent substrate, an insulating layer disposed on the second transparent substrate to cover the plurality of wiring electrodes, a plurality of segment electrodes disposed on the insulating layer, and a plurality of connection electrodes configured to electrically connect the plurality of wiring electrodes to the plurality of segment electrodes, respectively, while penetrating through the insulating layer.

2. The vehicular lamp according to claim 1, wherein the plurality of segment electrodes are arranged in a matrix.

3. The vehicular lamp according to claim 2, wherein:
the plurality of segment electrodes include a first group of segment electrodes arranged in a first direction in plan view, and
widths of the respective segment electrodes in the first group in the first direction become gradually narrower from one end side of the first group in the first direction toward a center of the first group in the first direction, and become wider from the center toward the other end of the first group in the first direction.

4. The vehicular lamp according to claim 3, wherein:
the plurality of segment electrodes include a second group of segment electrodes arranged in a second direction orthogonal to the first direction in plan view, and
widths of the respective segment electrodes in the second group in the second direction become gradually narrower from one end side of the second group in the second direction toward a center of the second group in the second direction and become wider from the center toward the other end of the second group in the second direction.

5. The vehicular lamp according to claim 4, wherein the plurality of wiring electrodes are disposed so as to overlap 80% or more of an entire region defined by gaps between the segment electrodes.

6. The vehicular lamp according to claim 3, wherein the plurality of wiring electrodes are disposed so as to overlap 80% or more of an entire region defined by gaps between the segment electrodes.

7. The vehicular lamp according to claim 2, wherein the plurality of wiring electrodes are disposed so as to overlap 80% or more of an entire region defined by gaps between the segment electrodes.

8. The vehicular lamp according to claim 2, wherein:
the plurality of segment electrodes include a first group of segment electrodes arranged in a first direction in plan view, and
widths of the respective segment electrodes in the first group in the first direction become gradually narrower from one end side of the first group in the first direction toward a center of the first group in the first direction, and a segment electrode the other end of the first group in the first direction has a larger width in the first direction than a segment electrode at the center of the first group in the first direction.

9. The vehicular lamp according to claim 1, wherein the segment electrodes have a plurality of different shapes in plan view.

10. The vehicular lamp according to claim 9, wherein the plurality of wiring electrodes are disposed so as to overlap 80% or more of an entire region defined by gaps between the segment electrodes.

11. The vehicular lamp according to claim 1, wherein the plurality of wiring electrodes are disposed so as to overlap 80% or more of an entire region defined by gaps between the segment electrodes.

* * * * *